United States Patent
Pumm et al.

(10) Patent No.: US 6,899,118 B1
(45) Date of Patent: May 31, 2005

(54) SINGLE COIL TWO OPERATOR CONTROLLER

(75) Inventors: Kevin M. Pumm, St. Louis, MO (US); Mike C. Santinanavat, Chesterfield, MO (US); Paul E. Reinhardt, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 326 days.

(21) Appl. No.: 09/652,770

(22) Filed: Aug. 31, 2000

(51) Int. Cl.[7] .......................... F16K 31/02; F16K 31/06
(52) U.S. Cl. ..................... 137/66; 251/129.15; 335/265
(58) Field of Search ............................ 137/65, 66, 595, 137/870, 15, 17, 315.03; 251/129.15; 335/265, 335/266; 431/54

(56) References Cited

U.S. PATENT DOCUMENTS

| | | | |
|---|---|---|---|
| 1,978,737 A | | 10/1934 | Bower et al. |
| 2,349,443 A | * | 5/1944 | McCarty ...................... 137/65 |
| 2,496,638 A | * | 2/1950 | Ray ............................ 1337/66 |
| 2,604,107 A | * | 7/1952 | Huntington et al. .......... 137/66 |
| 2,653,622 A | * | 9/1953 | Ray ............................. 137/66 |
| 2,920,693 A | * | 1/1960 | Thornbery ................... 137/66 |
| 3,165,327 A | * | 1/1965 | Cripe et al. ................. 137/596 |
| 3,576,473 A | | 4/1971 | Genbauffe et al. |
| 3,671,891 A | | 6/1972 | Usui et al. |
| 3,978,439 A | | 8/1976 | Thomson |
| 4,197,518 A | | 4/1980 | Seilly et al. |
| 4,201,116 A | * | 5/1980 | Martin ....................... 335/266 |
| 4,203,084 A | | 5/1980 | Yamaguchi et al. |
| 4,223,698 A | | 9/1980 | Reinicke |
| 4,282,501 A | * | 8/1981 | Myers ........................ 335/266 |
| 4,441,521 A | | 4/1984 | Brown et al. |
| 4,450,863 A | | 5/1984 | Brown |
| 4,479,162 A | * | 10/1984 | Offutt et al. ................. 335/266 |
| 4,503,411 A | | 3/1985 | Lofstrand |
| 4,773,445 A | | 9/1988 | Visket |
| 4,778,378 A | * | 10/1988 | Dolnick et al. ............... 137/65 |
| 4,787,414 A | | 11/1988 | Kelly et al. |
| 4,806,095 A | * | 2/1989 | Goldstein et al. ............. 137/65 |
| 4,921,011 A | | 5/1990 | Kelly et al. |
| 4,928,028 A | * | 5/1990 | Leibovich ................... 335/266 |
| 5,038,123 A | | 8/1991 | Brandon |
| 5,084,688 A | | 1/1992 | Martino |
| 5,095,944 A | | 3/1992 | Hochstrasser |
| 5,107,894 A | | 4/1992 | Hochstrasser |
| 5,111,846 A | | 5/1992 | Hochstrasser et al. |
| 5,199,456 A | * | 4/1993 | Love et al. .................. 137/270 |
| 5,404,908 A | | 4/1995 | Reinicke |
| 5,450,871 A | | 9/1995 | Reinicke |
| 5,464,041 A | | 11/1995 | Reinicke |
| 5,519,370 A | | 5/1996 | Perreira et al. |
| 5,563,563 A | | 10/1996 | Freitas et al. |
| 5,656,981 A | | 8/1997 | Niimi et al. |
| 5,823,507 A | * | 10/1998 | Inden et al. ............. 251/129.15 |
| 6,263,908 B1 | * | 7/2001 | Love et al. .................... 137/66 |

OTHER PUBLICATIONS 36E and 36F Gas Controls Product Information.
36F22 DSI and HIS Fast-Opening Combination Gas Valve Installation Instructions.

* cited by examiner

*Primary Examiner*—George L. Walton
(74) *Attorney, Agent, or Firm*—Harness Dickey & Pierce PLC

(57) ABSTRACT

A single coil, two operator controller for simultaneously actuating two spaced apart magnetically responsive operators has a bar extending between the spaced apart operators, and a coil on the bar, between the operators for creating a magnetic field for moving the magnetically responsive operators. The single coil, two operated controller is particularly suited for operating a gas valve.

28 Claims, 5 Drawing Sheets

SINGLE COIL TWO OPERATOR CONTROLLER

BACKGROUND OF THE INVENTION

This invention relates to a single coil, two operator controller, and in particular to a single coil, two operator controller for gas valves, and gas valves incorporating such a controller.

There are a number of instances where it is desirable to simultaneously operate two devices. For example, operating the main valve and the redundant value in a conventional gas valve. This is most commonly achieved by simultaneously operating two controllers, for example, two solenoids. Even if it were possible to operate the members with a single coil, the size and expense of a single coil to operate two operators would result in little, if any, savings.

SUMMARY OF THE INVENTION

The present invention relates to a single coil, two operator controller for simultaneously actuating two spaced apart magnetically responsive operators. The controller is particularly useful in conventional gas valves having a main and redundant valves, but which is applicable to other systems where it is desirable to simultaneously or nearly simultaneously operate two members. Generally, the controller comprises a bar extending between the spaced apart operators and a coil on the bar between the operators for creating a magnetic field for moving the magnetically responsive operators. There is preferably also a plate extending between the spaced apart operators to form a substantially closed flux path through the bar, the plate, and the two controllers, to facilitate the actuation of the magnetically responsive operators.

In the preferred embodiment, the single coil comprises first and second windings, and there is a return between the first and second coils, extending between the bar and the plate, forming two separate closed magnetic flux paths, each containing one of the operators. This allows a reduction in the overall size of the coil needed to actuate the two operators, resulting in reduction in material used and in cost of the controller. These and other features and advantages will be apparent in the detailed description of the invention.

BRIEF DESCRIPTION OF THE DRAWINGS

Corresponding reference numerals indicate corresponding parts throughout the several views of the drawings.

DETAILED DESCRIPTION OF THE INVENTION

Figure 1:
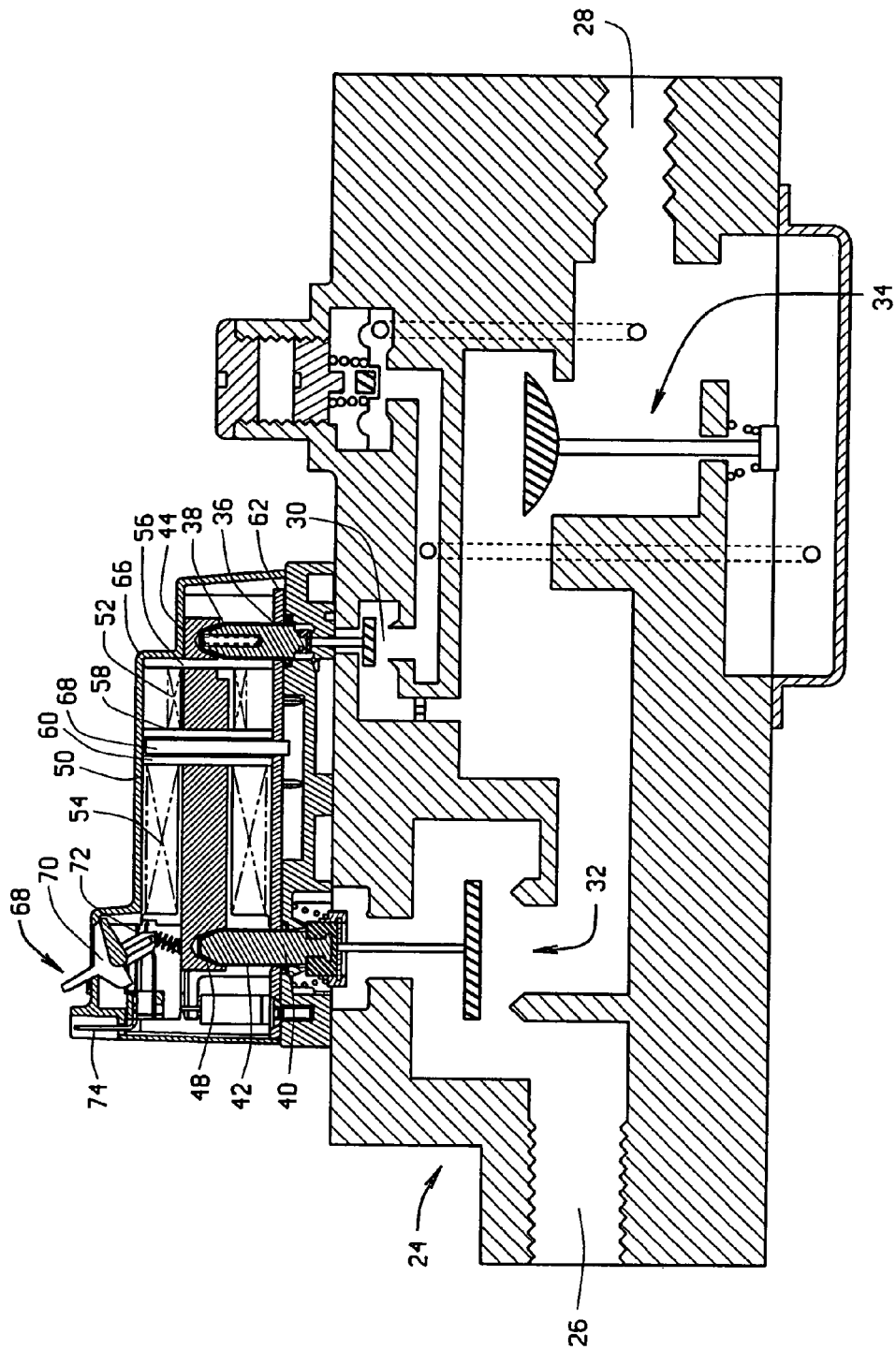
FIG. 1 is a longitudinal cross sectional view of a single coil, two operator controller of the present invention, shown as it would be incorporated into a conventional two-valve gas valve.
Figure 2:
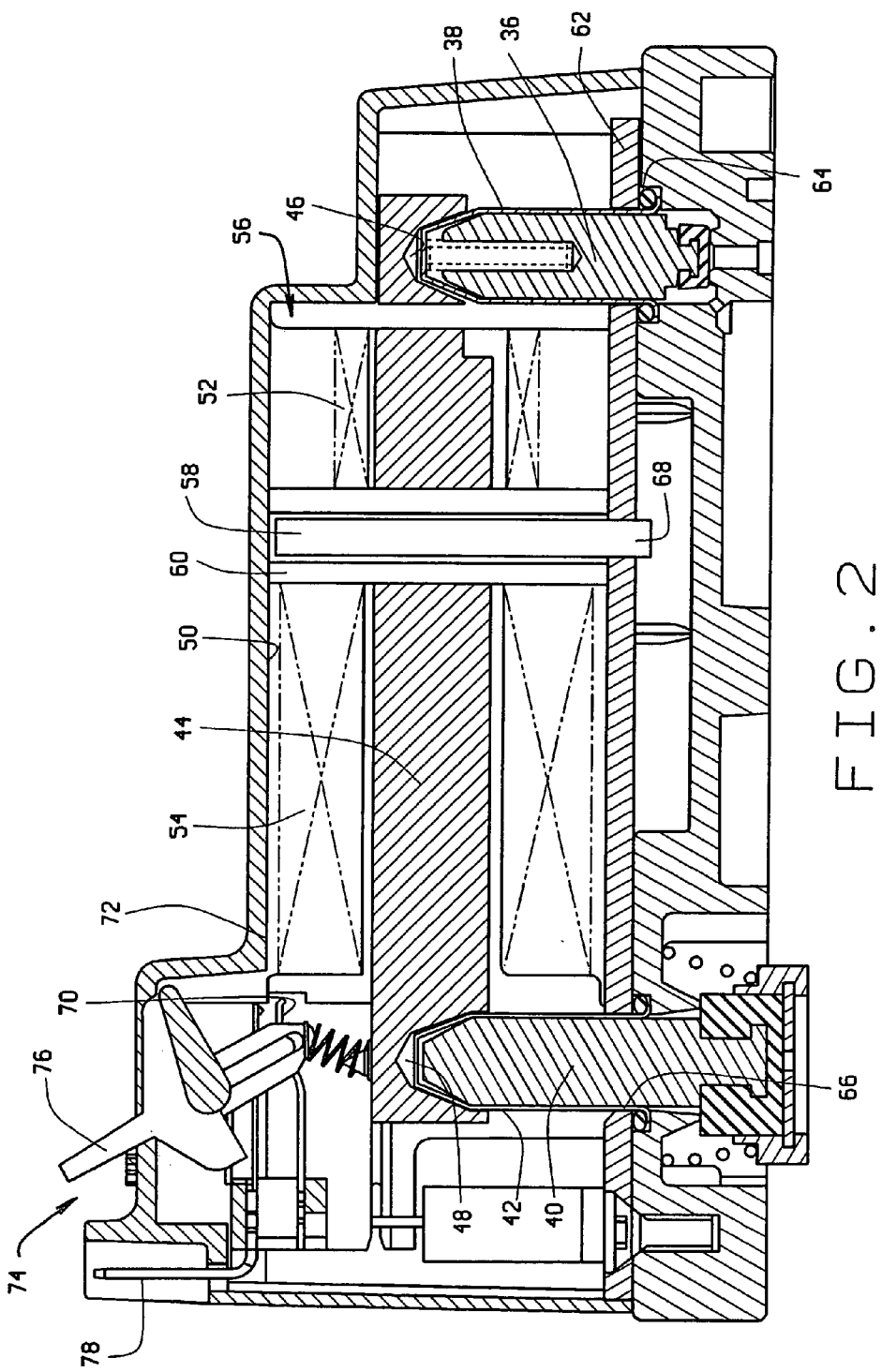
FIG. 2 is an enlarged longitudinal cross sectional view of the single coil, two operator controller of the present invention.

A single coil, two operator controller of the present invention, indicated generally as 20, is shown in FIG. 1 as it would be mounted on a conventional gas valve 24. The conventional gas valve 24 includes an inlet 26 and an outlet 28, a main valve 30 and an auxiliary valve 32, and a pressure regulator 34. When both the main valve 30 and the auxiliary valve 32 are open, the gas valve 22 provides gas from the inlet 26 to the outlet 28 at a pressure determined at least in part by the regulator 34. When either the main valve 30 or the auxiliary valve 32 is closed, gas does not flow through the gas valve 22.

The main valve 30 has a magnetically responsive operator 36 that reciprocates inside a closed-end sleeve 38. The sleeve 38 projects upwardly from the top surface of the gas valve 22. The reciprocating movement of the operator 36 opens and closes the main valve 30. Similarly, the auxiliary valve 32 has a magnetically responsive operator 40 that reciprocates inside a closed-end sleeve 42. The sleeve 42 projects upwardly from the top surface of the gas valve 22. The reciprocating movement of the operator 36 opens and closes the auxiliary valve 32.

The controller 20 comprises a bar 44 extending between the spaced apart operators 36 and 40. The underside of the bar 44 has recesses 46 and 48 for receiving the closed ends of the sleeves 38 and 42.

There is a coil 50 on the bar 44 of a flux-conducting material. The coil 50 comprises first and second winding sections 52 and 54 wound on a plastic core 56. The plastic core 56 has a first bobbin section 58 for the first winding section 52 and a second bobbin section 60 for the second winding section 54. As shown in the drawings and described herein, the first and second winding sections are unequal in size, although the sizes of the two winding sections depends upon their application, and thus, their relative sizes may differ in different applications.

A plate 62 extends substantially between the spaced apart operators 36 and 40. In the preferred embodiment, the plate 62 has openings 64 and 66 through which the sleeves 38 and 42 extend. The operators 36 and 40 are sized and positioned so that when the coil 50 is not energized, the operators form gaps G1 and G2 between the bar 44 and the plate 62, and when the coil is energized, the magnetic force moves the operators to close the gaps G1 and G2 and form a substantially continuous flux path through bar 44, operator 36, plate 62, and operator 38. The movement of the operators 36 and 40 to close the gaps G1 and G2 opens the main and auxiliary valves 30 and 32. There are small gaps between the plate 62 and the actuators and between the bar 44 and the actuators, but these are generally negligible.

In accordance with the preferred embodiment of this invention, a return 68, positioned between the first and second winding sections 52 and 54, extends between the bar 44 and the plate 62, providing an alternate flux path so that when the coil 50 is energized, two parallel paths L1 and L2 are formed, the first, L1, comprising operator 36, a portion of the plate 62, and the portion of the bar 44 over which the first winding section 52 lies, and the second, L2, comprising the return 68. In the preferred embodiment, the return 68 is a U-shaped member, arranged so that the bottom of the "U" extends over the bar 44, and the legs of the "U" are adjacent the plate, preferably fitting into slots 70 in the plate. The core 56 creates a small gap between the inside of the bottom of the "U" of the return, and the bar 44. A portion of the core 56 could be cut away to between the bobbin section to reduce or eliminate the gap.

Figure 3:
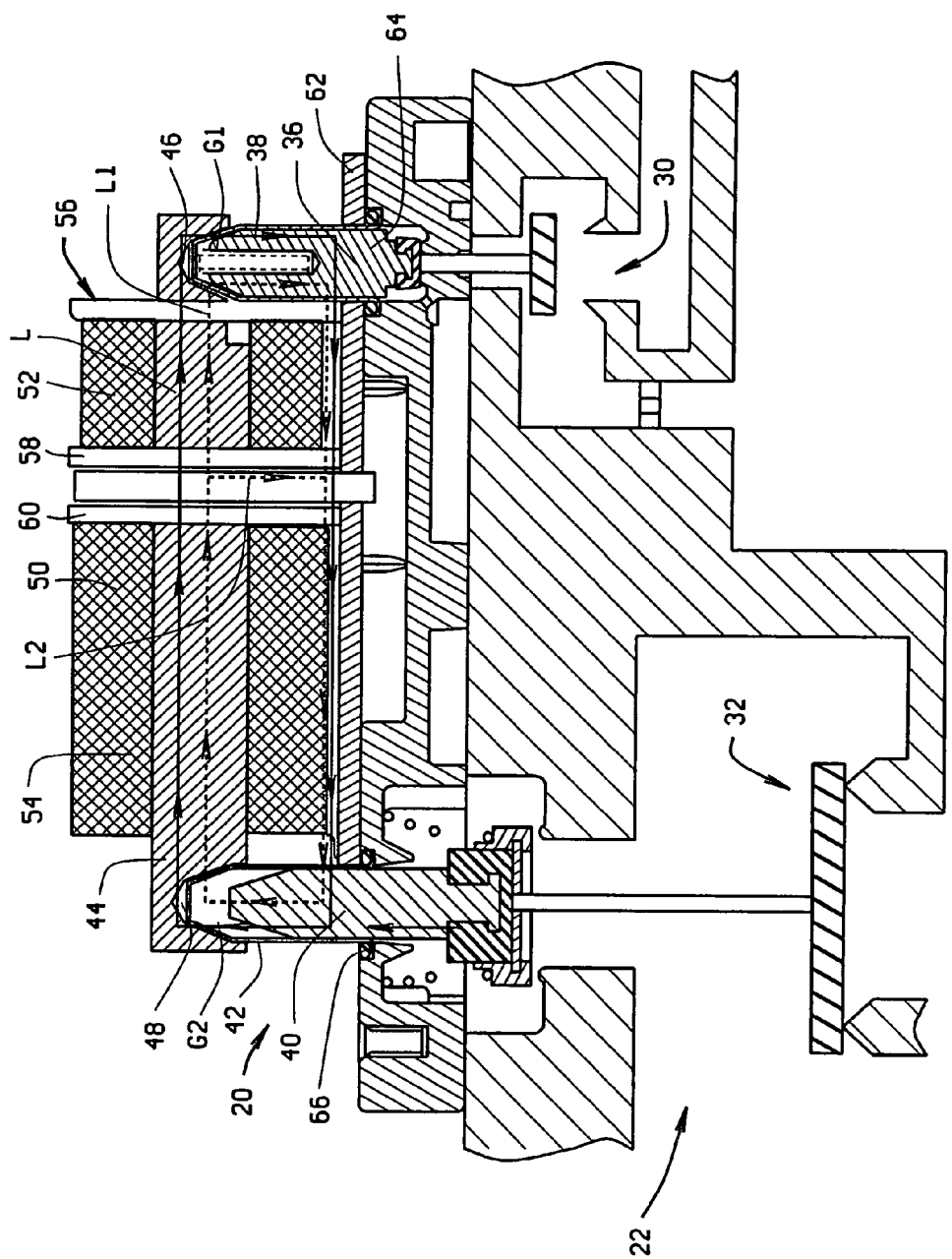
FIG. 3 is an enlarged longitudinal cross section view of the single coil, two operator controller of the present inventions, with its cover removed.
Figure 4A:
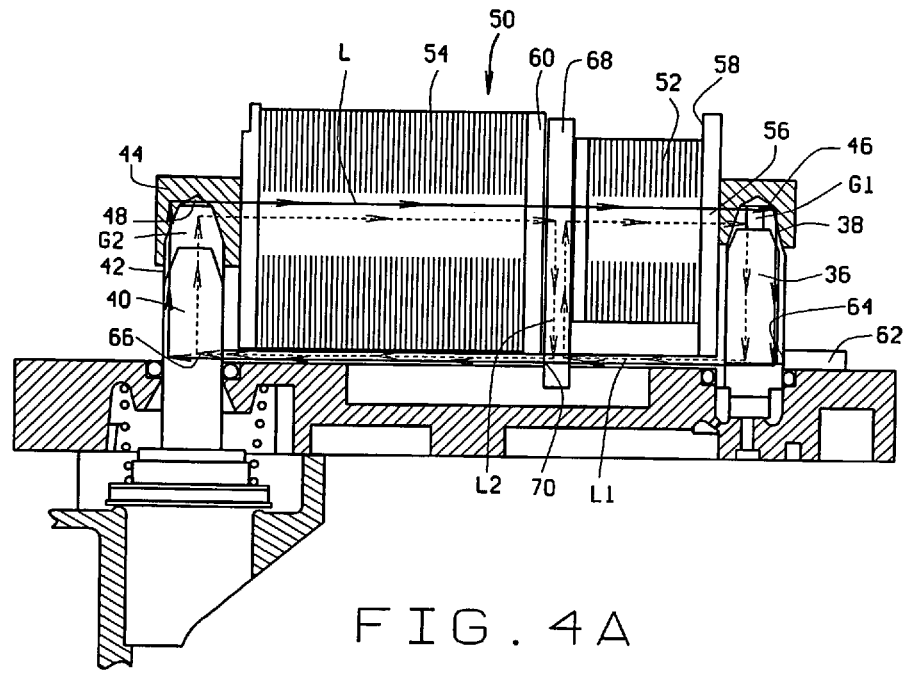
FIG. 4A is a side elevation view of the controller with the cover removed, showing the operations in position when the valve is closed.
Figure 4B:
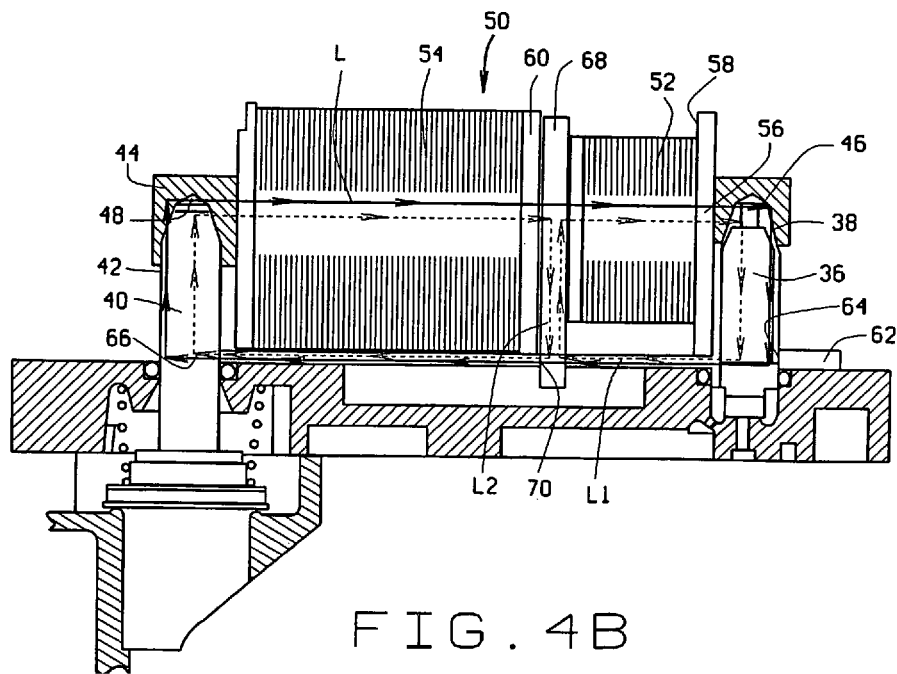
FIG. 4B is a side elevation view of the controller with the cover removed, showing the operations in position when the valve is open.
Figure 5:
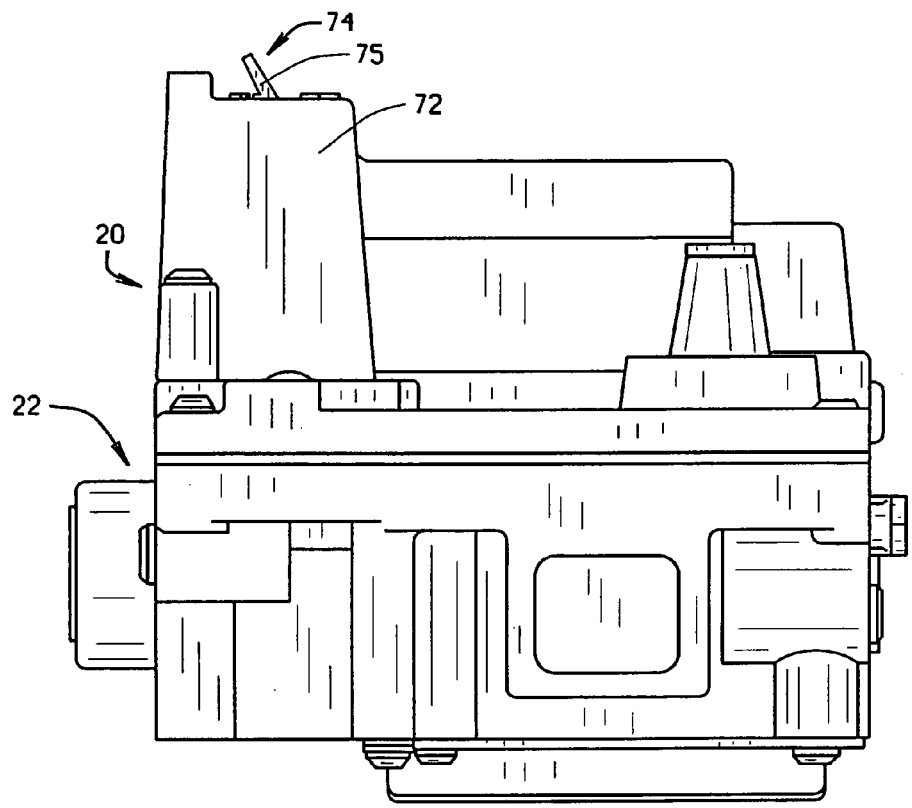
FIG. 5 is a side elevation view of a gas valve incorporating a single coil, two operator controller of the present invention.
Figure 6:
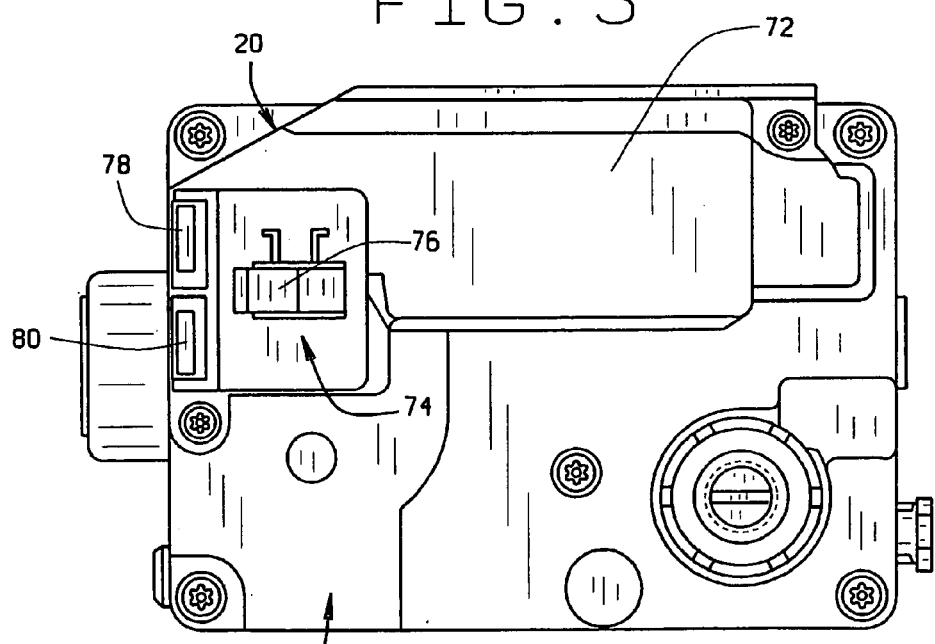
FIG. 6 is a top plan view of the gas valve.

As shown in FIG. 3, rather than a single path L with two gaps, G1 and G2, the return 64 provides two paths, L1 and L2, to substantially eliminate gap g1. Thus, the total size of the coil (in terms of number of turns) can be reduced. For one particular configuration of gas valve, it was determined that a single coil operating in a single path L would need 3600 turns to actuate the operators, and close the gaps G1 and G2, but that a single coil with two paths, L1 and L2, would need only 2700 turns in order to actuate the actuators and close the gaps G1 and G2.

In the particular gas valve design shown and described herein, the force required to operate the primary valve is substantially less than the force required to operate the auxiliary valve. Moreover, the gap G1 that defines the travel of operator 36 (about 0.05 inches) is approximately ⅓ of the gap G2 that defines the travel of the operator 50 (about 0.150 inches). Since path L2 substantially shunts gap G1 and path L1, the total gap is reduced by gap G1 (about 25 percent) such that the second winding section needs 2700 turns to actuate the operator 40 to close the gap G2.

In operation, when the coil 50 is energized, the magnetic force created by the second winding section 54 in path L2 moves the operator 40, closing the gap G2 and opening the auxiliary valve. The magnetic force created by the second winding, particularly after the second gap G2 is closed, also moves the operator 36, closing the gap G1 and opening the primary valve. The first winding 52 is not necessary to actuate the much lower force operator 36, but improves its actuation with only 200 turns.

The controller 20 is preferably enclosed in a housing 71. The controller 20 preferably also includes a switch 74 for selectively powering the coil 50 to open and close the gas valve. The switch 74 includes a switch member 76 pivotally mounted in the housing 72 to operate between the first and second positions. The switch member 76 is resiliently biased with an overcenter spring mechanism to retain the switch in its position until it is affirmatively operated to the other position. When the gas valve 22 is connected to a gas line, and the controller connected to a system via contacts 78 and 80, the controller 20 opens the gas valve 22 in response to applied power from the system when switch 74 is "on," but does not open the gas valve in response to applied power from the system when the switch is "off."

The controller 20 thus economically operates both the main valve 30 and the auxiliary valve 32 of the gas valve with a single coil, and in the preferred embodiment that includes the return 68, with a single coil with minimal number of turns, thus reducing material usage and cost.

What is claimed:

1. A single coil, two operator controller for simultaneously actuating two spaced apart magnetically responsive operators, the controller comprising:
   a bar extending between the spaced apart operators;
   a coil on the bar, between the operators for creating a magnetic field for moving the magnetically responsive operators; the coil and bar arranged with respect to the spaced apart magnetically responsive operators to establish separate magnetic flux through each of the spaced apart magnetically responsive operators.

2. A single coil, two operator controller for simultaneously actuating two spaced apart magnetically responsive operators, the controller comprising:
   a sleeve, having first and second ends, generally surrounding each operator, in which the operator can move;
   a plate generally adjacent the first end of each sleeve
   a bar generally adjacent the second end of each sleeve; and
   a coil on the bar, between the sleeves, for creating a magnetic field for moving the magnetically responsive operators in the sleeves.

3. The controller according to claim 2 wherein the second end of each sleeve is closed, and wherein the bar has a recess therein for receiving the closed second end of each sleeve.

4. The controller according to claim 2 where the coil comprises first and second winding sections connected in series and separated by a gap.

5. The controller according to claim 4 further comprising a return between the first and second winding sections, extending substantially between the plate and the bar.

6. The controller according to claim 5 wherein the return comprises in an U-shaped member, oriented so that the ends of the legs of the "U" are adjacent the plate, and the bottom of the "U" extends over the bar.

7. The controller according to claim 6 wherein the plate has cutouts for receiving the ends of the legs of the "U".

8. A single coil split flux path electromagnetic two operator controller comprising:
   a core element made of magnetic flux conducting material and having opposite first and second ends defining a length of the core element there between;
   a single coil winding, the winding being wrapped around the core element along a portion of the length of the core and having first and second ends, the winding being configured to magnetize said core element and create an electromagnet when energized by passing an electrical current through the winding, said electromagnet creating a magnetic field and an associated flux path when energized, the core being part of the flux path and the first and second ends of the core element being respective first and second poles of said electromagnet;
   first and second operators made of magnetic flux conducting material, said operators each being movable between independent first and second positions and being biased so that when the electromagnet is not energized the operators are in their respective first positions;
   a support member supporting the electromagnet so that the first and second poles of the electromagnet are in a spaced apart relation from the respective first and second operators and within the flux path of the electromagnet along with the first and second poles, the first and second operators being attracted to the respective first and second poles and moving from their respective first positions to their respective second positions when the electromagnet is sufficiently energized;
   a base made of magnetic flux conducting materials, the base separating the first and second operators and being part of the flux path when the electromagnet is energized; and
   a flux divider made of magnetic flux conducting material, the flux divider separating the winding into the primary and secondary windings, and thereby separating the flux path into respective primary and secondary flux paths, the flux divider extending to a location on the base between first and second operators, the primary flux path generally going from the first pole through the first operator through the base through the flux divider through the core within the primary winding and back to the first pole, the secondary flux path generally going from the core element within the secondary winding through the flux divider through the base through the second operator through the second pole and back to the core within the secondary winding, the primary winding being sized to generate sufficient flux to pull the first operator towards the first pole and into the first operator's second position when the electromagnet is energized, the secondary winding being sized to generate sufficient flux to pull the second operator towards the second pole and into the second operator's second position when the electromagnet is energized.

9. The controller of claim 8, wherein:
the single coil winding is wound on a bobbin, the bobbin having first and second ends defining a length of the bobbin there between and a hollow interior bore between the first and second ends, the interior bore being dimensioned to allow the core element to fit inside the interior bore, the winding covering a portion of the length of the bobbin and the core element being within the interior bore of the bobbin with the first and second core ends extending beyond the winding on the bobbin, the winding, bobbin and core element thereby forming the electromagnet when energized.

10. The controller of claim 9, wherein:
the bobbin has an integral switch, the switch being selectively adjustable between on and off positions, the switch is electrically connected to the winding and has connection members for electrically connecting the switch to an electric current source to energize the electromagnet, the switch separating the electric current source from the winding and allowing current to flow through the winding when in the on position and preventing current from flowing through the winding when in the off position.

11. The controller of claim 9, wherein:
the bobbin has an integral rectifier electrically connected to the winding and separating the winding from a current source, the rectifier having connection elements for electrically connecting to a current source to energize the electromagnet, the rectifier, when connected to an alternating current source, converting the alternating current to a direct current to thereby energize the electromagnet with direct current.

12. The controller of claim 9, wherein:
the core element has a cross-sectional shape perpendicular to the core length that is generally circular and the bobbin has a cross sectional shape perpendicular to the bobbin length that is generally circular.

13. The controller of claim 12, wherein:
the flux divider is generally U-shaped and is positioned around the generally circular cross-section of the bobbin so that the flux divider encircles approximately 180 degrees of the generally circular cross-section and extends to the base.

14. The controller of claim 8, wherein:
The support member is comprised of a pair of legs, the pair of legs being first and second legs, and extending to the respective first and second poles of the electromagnet, the first leg having a hollow interior dimensioned to allow the first operator to fit inside the first leg and move from the first operator's first position to the first operator's second position while inside the fist leg, and the second leg having a hollow interior dimensioned to allow the second operator to fit inside the second leg and move form the second operator's first position to the second operator's second position while inside the second leg.

15. The controller of claim 8, wherein:
The flux divider extends through the base and makes contact with the base when the electromagnet is energized.

16. A single coil controller with divided flux path comprising:
an electrically operated coil, the coil enclosing a portion of a magnetic flux conducting rod, the coil and rod thereby being inductively coupled and making an electromagnet when an electrical current is passing through the coil;
a first magnetic flux conducting plunger in a spaced apart relation from a first end of the rod, the first plunger being moveable between two positions and being biased to be in one of the two positions;
a second magnetic flux conducting plunger in a spaced apart relation from a second end of the rod, the second plunger being moveable between two positions and being biased to be in one of the two positions;
a magnet flux conducting divider having opposite sides and separating the coil into first and second windings, the divider being adjacent to the rod portion enclosed by the coil with the first and second windings being on opposite sides of the flux divider between the divider and the respective first and second rod ends;
a magnetic flux conducting base adjacent to the divider and separating the first and second plungers with the divider being between the first and second plungers, thereby inductively coupling the base, the divider, and the first and second plungers with the coil and rod when the electrical current is passed through the coil; and
the first winding being sized to cause the first plunger to move to the nonbiased position when the electrical current is passing through the coil, the second winding being sized to cause the second plunger to move to the non-biased position when the electrical current is passing through the coil.

17. The controller of claim 16, wherein:
a bobbin surrounds a portion of the rod and the coil encloses a portion of the bobbin, the rod and coil being inductively coupled and making an electromagnet when the electrical current is passing through the coil.

18. The controller of claim 16, wherein:
a switch is electrically connected to the coil and separates the coil from the current source, the switch being selectively positionable between open and closed positions and having electrical connectors adapted to be connected to the current source, the switch preventing current from flowing through the coil when in the open position and allowing current to flow through the coil when in the closed position.

19. The controller of claim 16, wherein:
A rectifier is electrically connected to the coil and separates the coil from the current source, the rectifier having electrical connectors adapted to be connected to the current source and converting an alternating current to direct current when connected to an alternating current source.

20. The controller of claim 16, wherein:
the first plunger is connected to a valve and when the first plunger is moved between the two positions, the valve opens and closes.

21. The controller of claim 16, wherein:
the second plunger is connected to a second valve, and when the second plunger is moved between the two positions, the second valve opens and closes.

22. The controller of claim 16, wherein:

the divider has a closed end and an open end and is generally U-shaped and the base has at least one slot, the closed end being positioned around a portion of the rod and the open end extending through at least one slot in the base, the divider being in contact with the base when the electrical current is passing through the coil.

23. The controller of claim 16, wherein:

the divider passes through the base and is in contact with the base when the electrical current is passing through the coil.

24. A method of splitting the flux path of a single coil two operator controller-to create two flux paths to control the two operators, the method consisting of:

providing a magnetic flux conducting core with laterally opposite first and second ends defining a lateral length there between;

enclosing a portion of the length of the core with an electrically operated coil, the coil comprised of an electrically conducting wire, the wire winding around a first section of the core and a second section of the core, the first and second sections being laterally spaced apart along the length of the core;

placing a magnetic flux conducting divider adjacent the core between the first and second sections of windings providing first and second magnetic flux conducting operators in a spaced apart relation from the respective first and second core ends, the first operator being moveable between two positions and being biased to be in one of the two positions, the second operator being moveable between two positions and being biased to be in one of the two positions; and providing a magnetic flux conducting base, the base separating the first and second operators in a spaced apart relation with the divider adjacent the base between the first and second operators, the base, the first and second operators, the divider and the core being inductively coupled and causing the first and second operators to move from the respective biased positions to the respective non-biased positions when an electrical current is passed through the coil.

25. The method of claim 24, further comprising the step of:

providing a switch electrically connected to the coil and separating the coil from an electrical current source, the switch being selectively adjustable between on and off positions and having electrical connectors adapted to be connected to the electrical current source, the switch preventing current from flowing through the coil when in the off position and allowing current to flow through the coil when in the on position.

26. The method of claim 24, further comprising the step of:

providing a rectifier electrically connected to the coil and separating the coil from an electrical current source, the rectifier having electrical connectors adapted to be connected to the electrical current source and converting alternating current to direct current when connected to an alternating current source.

27. The method of claim 24, further comprising the step of:

sizing the first sections of winding to provide sufficient flux to pull the first operator from the biased position to the non-biased position when an electrical current is passed through the coil; and sizing the second section of winding to provide sufficient flux to pull the second operator from the biased position to the non-biased position when the electrical current is passing through the coil.

28. A controller for simultaneously actuating two spaced apart magnetically responsive operators, the controller comprising:

means for generally surrounding each operator while allowing each operator to move;

means for providing a first flux path through a first of the surrounding means;

means for providing a second flux path through the second surrounding means; and means for conducting current between the surrounding means to create flux in the first and second flux paths that moves the operators in the surrounding means.

\* \* \* \* \*